United States Patent [19]
Williams

[11] Patent Number: 5,126,678
[45] Date of Patent: Jun. 30, 1992

[54] A.C. GENERATOR FAULT DETECTOR

[76] Inventor: David C. Williams, 2 Nunfield, Chipperfield, Kings Langley, Hertfordshire, England, WD4 9EW

[21] Appl. No.: 687,786

[22] Filed: Apr. 22, 1991

Related U.S. Application Data

[63] Continuation of Ser. No. 382,586, Jul. 20, 1989, abandoned.

[30] Foreign Application Priority Data

Jul. 23, 1988 [GB] United Kingdom ............... 8817599

[51] Int. Cl.$^5$ ............................................. G01R 31/06
[52] U.S. Cl. ............................ 324/545; 324/158 MG; 361/85
[58] Field of Search ............... 324/545, 158 MG, 521, 324/522; 361/85, 56, 21, 76, 78

[56] References Cited

U.S. PATENT DOCUMENTS

| | | | |
|---|---|---|---|
| 3,286,129 | 11/1966 | Gagniere | 324/545 |
| 3,313,984 | 4/1967 | Hupp. | |
| 3,519,884 | 7/1970 | Paddison et al. | 361/76 |
| 3,633,072 | 1/1972 | Duncan | 361/78 |
| 3,654,516 | 4/1972 | Traversi | 361/85 |
| 3,699,431 | 10/1972 | Paddison et al. | 324/521 |
| 3,848,160 | 11/1974 | Boothman et al. | 361/76 |
| 4,333,119 | 6/1982 | Schoenmeyr | 361/85 |
| 4,419,625 | 12/1983 | Béjot et al. | 324/158 MG |
| 4,703,387 | 10/1987 | Miller | 361/85 |
| 4,724,503 | 2/1988 | Libert | 361/76 |
| 4,751,653 | 6/1988 | Junk et al. | 324/83 D |
| 4,841,404 | 6/1989 | Marshall et al. | 361/85 |
| 4,878,208 | 10/1989 | Seki et al. | 361/85 |

FOREIGN PATENT DOCUMENTS 694968 10/1989 U.S.S.R. ............................ 361/21

Primary Examiner—Kenneth A. Wieder
Assistant Examiner—Maura K. Regan

[57] ABSTRACT

Faults in the operation of a multi-phase A.C. generator are detected by monitoring the phase difference between two line-to-line voltage of the generator and comparing this phase difference with a predetermined value or range of values to indicate a fault.

7 Claims, 5 Drawing Sheets

A.C. GENERATOR FAULT DETECTOR

This application is a continuation of application Ser. No. 07/382,586, filed Jul. 20, 1989, now abandoned.

The present invention relates to a fault detector for an A.C. generator and more particularly to a detector for detecting both open and short circuit faults at the output of a three phase generator or other three phase source.

A known method for detecting such faults monitors the peak and mean amplitude of the voltage at the output of a three phase full wave rectification of the three phase source. Changes in the amplitude of the ripple superimposed on a D.C. component of the output signal from the rectifier due to a fault condition are sensed and used to identify and signal the presence of a fault. However, even in operation with no fault present, the ripple may not be regular. For example voltage regulation of a main power generator field by pulse width modulated switching may take current from the generator in such a way as to cause peaks and troughs in the otherwise steady ripple. Since the ripple is of small amplitude such a means of regulation resulting in a non regular variable amplitude leads to difficulties in identifying amplitude changes representative of a fault condition.

It is an object of the present invention to provide a fault detector for a multi phase A.C. generator which avoids the above problem. The detector of the invention monitors the phase relationship of the voltages generated in the windings, this phase relationship being substantially constant even during the conditions imposed by voltage regulation by switching.

A particular feature is that the output of a three phase generator can be monitored using only two transformer windings.

The present invention provides a fault detector for a multi-phase alternating current (A.C.) generator including means for determining the phase difference between two line-to-line voltages of a generator and means for comparing this phase difference with a predetermined value or range of values to indicate a fault.

Preferably the means for determining the phase difference between the two line-to-line voltages includes timing means for determining when the voltage signals are above a predetermined voltage level. In a preferred embodiment the means for determining the phase differences includes an integrator discharged only when the line-to-line voltage signals are above a predetermined voltage level.

Preferably the output of the integrator means is monitored, and a fault condition is indicated if the output level of the integrator means is outside predetermined limits.

Embodiments of the present invention will now be described, by way of example with reference to the accompanying drawings, in which.

Figure 1:
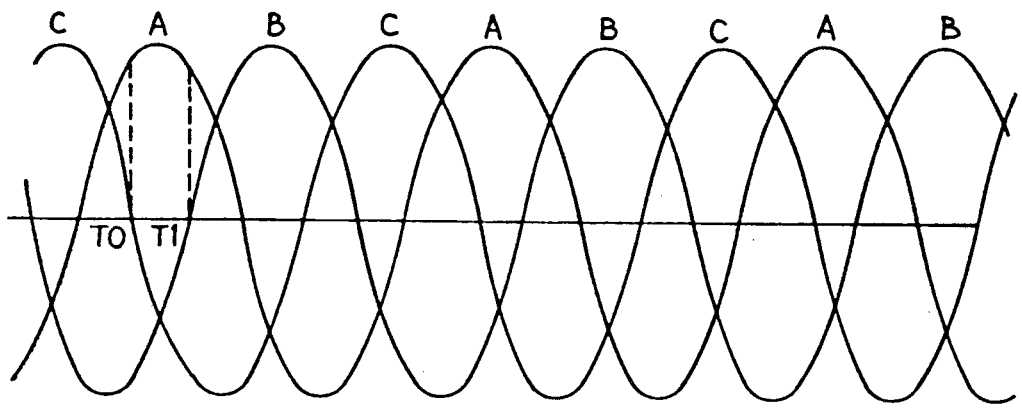
FIG. 1 shows the output voltage waveforms for a three phase A.C. generator.

With reference now to FIG. 1, the three output voltage waveforms A, B and C of a three phase A.C. generator are shown. These three waveforms are symmetrically spaced with a 120° phase difference between each waveform. Each waveform A, B and C is generated, in well known manner, independently by separate winding configurations in the A.C. generator. Each winding can be subject to a fault (as hereinafter explained in greater detail with reference to FIGS. 7 to 12) and this results in a distortion of one or more of the output waveforms of the A.C. generator.

Figures 2, 3:
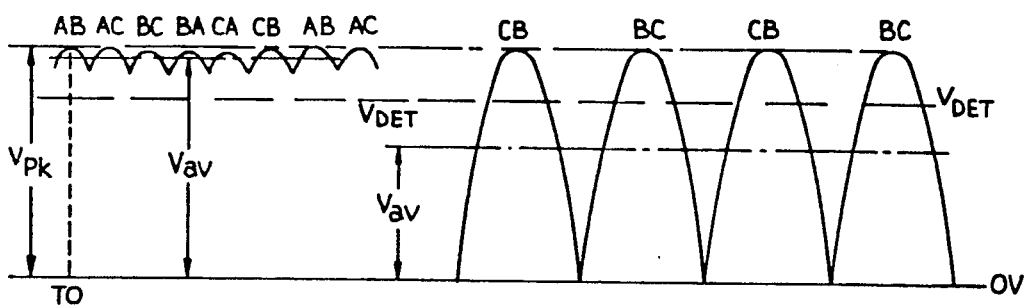
FIG. 2 shows a waveform illustrating a known system for monitoring the output of a three phase generator.
FIG. 3 shows a waveform illustrating the variation in waveform of the system of FIG. 1 under fault conditions.

With reference to FIG. 2 the normal operation of the three phase generator provides in known manner at the output of a full wave rectifier (see FIG. 4) a cumulative output waveform Vdc which comprises a series of voltage peaks which are at six times the frequency of the three output waveforms A, B and C. These voltage peaks are referenced AB, AC ... AB, AC in FIG. 2. Peak AB is formed from the effective addition of waveforms A and B at time TO and peak AC is formed from the effective addition of waveforms A and C at time T1 these providing a "positive" output in well known manner across the rectifier due to the effect of full wave rectification. Also in known manner these small peaks are normally smoothed to form a D.C. output with an averaged value $V_{av}$ which has a peak voltage of $V_{pk}$.

In normal operating conditions the difference in value between the average D.C. level $V_{av}$ and the peak voltage $V_{pk}$ will not substantially vary even with wide variations in current load imposed on the generator. However, as is shown in FIG. 3 if one of the phases fails then the value of the average voltage $V_{av}$ will fall substantially relative to the peak voltage $V_{pk}$ which will remain the same. In FIG. 3 it is assumed that the A.C. generator has a fault such that the winding generating phase A becomes open circuit thereby removing phase A from the output. The peaks formed after full wave rectification are therefore only those with phases B and C and the average voltage. $V_{av}$ is seen to fall considerably in value whilst $V_{pk}$ for phase B and C remains at the same level prior to the fault.

By using a voltage comparator circuit set at a level $V_{DET}$ where $V_{DET}$ is a proportion of the peak smoothed voltage $V_{pk}$, and connected to the smoothed output of the full wave rectifier the average voltage level can be monitored. With reference to FIGS. 2 and 3 this voltage level $V_{DET}$ can be set well below the average voltage level $V_{av}$ for the normal condition (FIG. 2) and therefore even if the voltage output falls under altering load conditions the detector will not indicate a fault condition. Only the loss of a phase will normally cause the voltage level $V_{av}$ to fall below $V_{DET}$ and hence cause a fault to be indicated.

Figure 4:
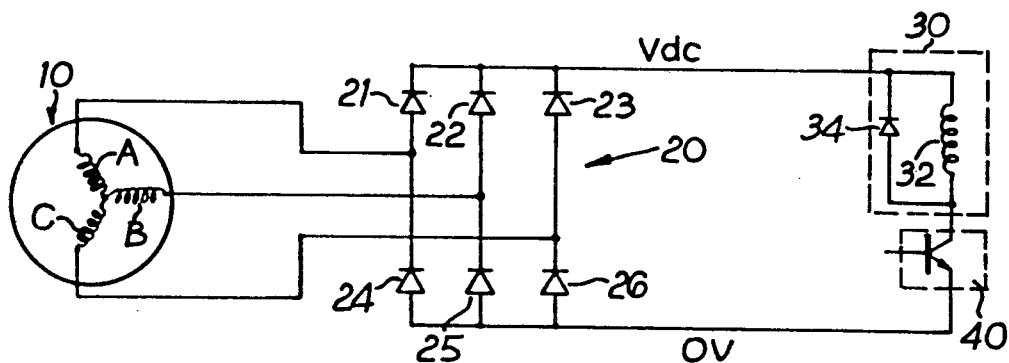
FIG. 4 shows an A.C. generator connected to a load illustrating the principle of the present invention.

With reference now to FIG. 4 the A.C. generator 10 is illustrated diagrammatically by three output "phase" windings A, B, and C which supply power to a full wave rectifier 20 comprising diodes 21, 22, 23, 24, 25 and 26. The rectified output voltage Vdc is supplied to a load 30 which comprises a field winding 32 of a main power generator (not shown) and a protection diode 34.

The generator 10 is therefore used as the pilot exiter and prime source of control equipment power in the main generator.

The current supplied to the field winding 32 is controlled by a semiconductor switch 40 which is operated as a switch mode power supply. Switch 40 is shown by way of example as a transistor switch but could be a thyristor or controlled diode switch.

Thus to control the average value of current supplied to field winding 32, transistor switch 40 is switched on and off for required periods controlled by a control circuitry (not shown) in accordance with the power output required by the main generator. Thus for example if full power is required then transistor switch 40 is left on permanently but for lower levels transistor switch 40 is turned off for required time periods such that the average current value reduces to the required level.

A problem which arises is that because transistor 40 is turned off and on very rapidly sudden changes in load are imposed on the generator 10 and this can cause the peak voltage to vary from cycle to cycle. Since the reference voltage $V_{DET}$ is proportional to the highest peak, $V_{DET}$ effectively increases with respect to the average, giving rise to a fault signal when no fault is present.

Figure 5:
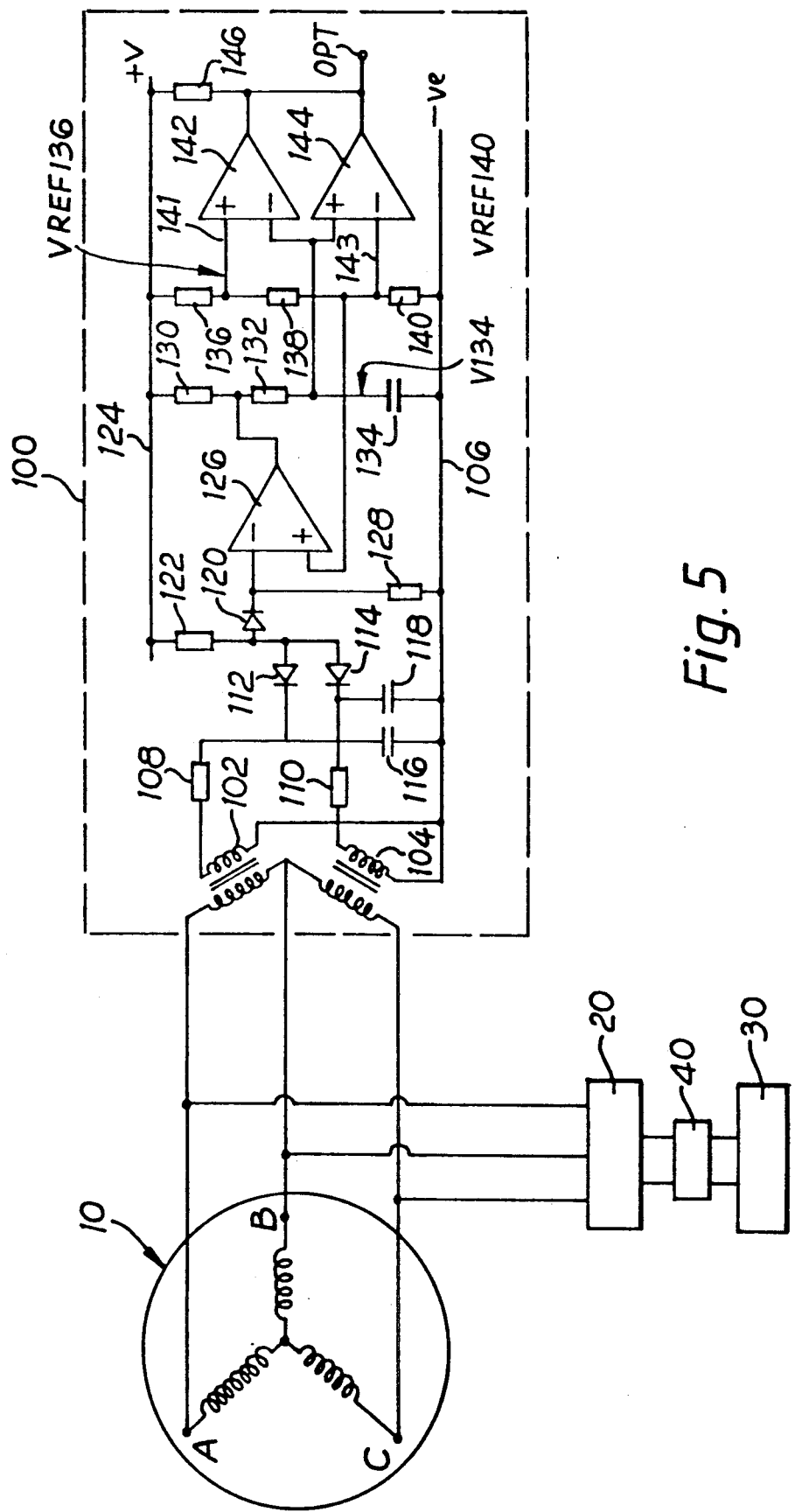
FIG. 5 shows a three phase A.C. generator fault detector according to the present invention.

The circuit according to the present invention as shown FIG. 5 overcomes the problems associated with the above described known fault detection circuit.

With reference now to FIG. 5, the A.C. generator 10 is connected to supply the switched load 30, 40 via the full wave rectifier 20 as in FIG. 4. The fault detection circuit connected to the A.C. generator 10 is shown within the dotted outline box 100.

Circuit 100 comprises first and second sensing transformers 102, 104 the primary windings of which are connected across the outputs of winding A and B and B and C respectively. One terminal of each secondary winding of transformers 102, 104 is connected to an earth rail 106. The other terminal of each transformer 102, 104 is connected to a respective resistor 108, 110. The opposite ends of resistors 108, 110 are connected to the cathode of respective diodes 112, 114 and to one plate of respective capacitors 116, 118 the other respective plates of which are connected to earth rail 106.

The anodes of diodes 112, 114 are commoned and are connected to the anode of a diode 120 and to one terminal of a resistor 122 the other terminal of which is connected to a positive voltage rail 124.

The cathode of diode 120 is connected to a negative input of a comparator circuit 126 and to one terminal of a resistor 128 the other terminal of which is connected to earth line 106. The output of comparator 126 is connected to the junction of resistors 130, 132; resistors 130 and 132 forming part of a resistor capacitor chain, formed by the series connection of resistors 130 and 132 and a capacitor 134, connected between the positive voltage rail 124 and the earth rail 106.

A positive reference voltage input for comparator 126 is provided by a series resistor chain comprising resistors 136, 138 and 140 connected between the positive rail 124 and the earth rail 106, the input being taken from the junction of resistors 138 and 140.

The junction of resistor 132 and capacitor 134 in the series chain 130, 132, 134 is connected to the negative input of a comparator 142 comprising an operational amplifier and also to the positive input of a comparator 144 comprising an operational amplifier.

A reference voltage input for comparator 142 is provided by connecting the positive input of the comparator to the junction of resistors 136 and 138 in resistor chain 136, 138, 140.

A reference voltage input for comparator 144 is provided by connecting the negative input of the comparator to the junction of resistors 138 and 140 in resistor chain 136, 138, 140.

The outputs of comparators 142, 144 are commoned and connected to one terminal of a resistor 146 the other terminal of which is connected to the positive voltage rail 124.

The general operation of the circuit is that the voltage across capacitor 134 is constantly compared with the two reference voltages supplied to the positive input 141 of comparator 142 and the negative input 143 of comparator 144. These reference voltages provide an effective upper and lower limit for the voltage on capacitor 134. If the voltage is above the maximum positive value then an output indicating a fault condition will be given by comparator 142 and if the voltage across capacitor 134 is below the minimum positive value then an output indicating a fault condition will be given by comparator 144.

Capacitor 134 is charged by the positive rail 124 through the series combination of resistors 130 and 132 because it is in the series chain 130, 132 and 134 between the positive rail 124 and earth rail 106. When comparator 126 is in a first or OFF condition capacitor 134 is charged by the series resistor combination 130, 132. When comparator 126 switches to a second, ON, condition capacitor 134 is discharged via resistor 132 and the output stage of comparator 126. Thus the charge level on capacitor 134 is effectively controlled by the value of resistors 130 and 132 and by the ON/OFF time comparator 126.

Comparator 126 is controlled by the value of the voltage on the cathode of diode 120. If this value exceeds the positive reference voltage supplied by resistor chain 136, 138, 140 then the comparator switches ON and capacitor 134 commences to discharge and if it is less than this voltage then comparator 126 switches OFF and capacitor 134 commences to recharge again.

The voltage on the cathode of diode 120 is controlled by the conduction of diodes 112 and 114. If either of these diodes conducts then the voltage on the anode of diode 120 will be determined by the series chain comprising resistor 122, diode 112 (or 114), resistor 108 (or 110) secondary winding of sensing transformer 102 (or 104) connected between the positive rail 124 and earth rail 106. (Capacitors 116, 118 together with respective resistors 108 and 110 form R-C combinations which serve to attenuate spikes and R.F. noise which could cause mal-operation of the fault sensing circuitry).

Thus comparator 126 is controlled by the voltage generated in the secondary windings of sensing transformers 102 and 104. This voltage is in turn proportional to the voltage generated in the windings of the generator 10.

Figure 6:
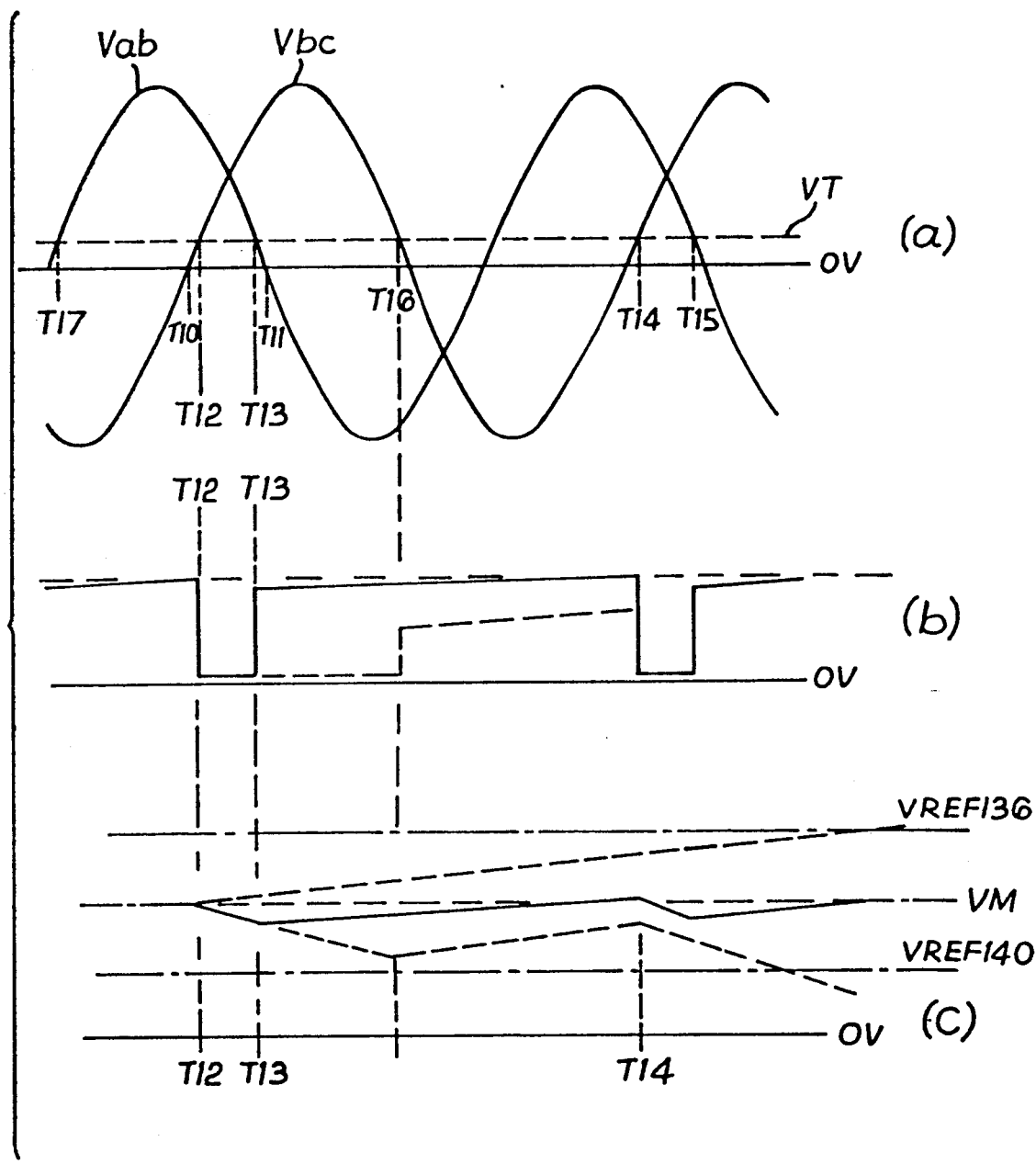
FIGS. 6a–6c shows waveforms explaining the operation of the circuit of FIG. 5.

The normal operation of the circuit will now be described with reference to FIG. 6. In FIG. 6a the output waveforms Vab and Vbc of the secondary windings of transformers 102 and 104 are shown. These waveforms are in a specific 17 volts RMS but could be of any suitable voltage level. The waveforms are theoretically 120° out of phase therefore cross the zero voltage line at time intervals T10 and T11 which are theoretically 60° apart in phase difference.

The cathodes of diodes 112 and 114 will only be both positive for this time interval T10 to T11 and it may be seen that as the voltage Vbc rises a threshold level VT (in a specific example +2 volts) will be reached at which the voltage on the cathode of diode 114 will rise to a level whereby the voltage on the anode of diode 120 and hence on its cathode will rise towards the positive voltage rail 124. At a time T12 the voltage of waveform Vbc will, by choice of the reference voltage on the positive input of comparator 126, exceed that reference voltage and comparator 126 will switch states to the ON condition as defined. This is shown in FIG. 6b in which at time T12 the output of comparator 126 goes negative towards zero volts from a positive voltage level dicated by the resistor and capacitor chain 130, 132, 134 (in the preferred example this voltage is 3.6 volts assuming a positive rail voltage of +5 volts).

With reference to FIG. 6c this shows the voltage on the plate of capacitor 134 connected to resistor 132. The dotted line $V_M$ represents a mean, normal level and in the preferred example this is +3.1 volts. At time T12 the capacitor commences to discharge as shown the voltage level falling to below the mean level.

At time T13 waveform Vab falls below the threshold voltage VT and therefore diode 112 will pull the voltage on the anode of diode 120 negatively and cause the voltage on the cathode of diode 120 to fall thereby changing the state of comparator 126 causing it to turn OFF as shown in FIG. 6b.

When comparator 126 turns OFF the capacitor 134 ceases discharging and commences to recharge again via resistor chain 130, 132 to above the mean voltage level. In the preferred example the peak to peak voltage ripple is approximately 60 mV.

The discharge cycle as described is repeated as shown whenever both waveforms Vab and Vbc are above the threshold voltage level as shown at T14 and T15 in FIG. 6a.

Thus capacitor 134 is maintained at a charge level of 3.1±30 mV during normal operation. This voltage is compared in both comparators 142 and 144 with the reference voltages present on the junction of resistors 136 and 138 and 138 and 140 respectively referred to as VREF136 and VREF140. These reference voltages may for example be set at +4 and +2 volts respectively.

Providing that the voltage on capacitor 134 (V134) is between these two reference voltage levels then both comparators 142 and 144 will be in the same condition referred to as an OFF condition. The output terminal OPT will therefore be in a high voltage condition being connected via resistor 146 to the positive voltage rail 124.

If however the voltage V134 on capacitor 134 changes to outside these reference voltage levels then one of the comparators will change state to an ON condition, comparator 142 if V134 rises and comparator 144 if V134 falls. A change of state of either comparator will indicate a fault condition by causing the voltage on the output terminal OPT to fall to a low voltage condition. This fault condition can be used in known manner to indicate a fault by energising a lamp control circuit (not shown) or via a feedback system to automatically stop the generator thereby preventing further damage.

The fault conditions for the generator are illustrated diagrammatically in FIGS. 7 to 12 to which reference is now made.

Figure 7:
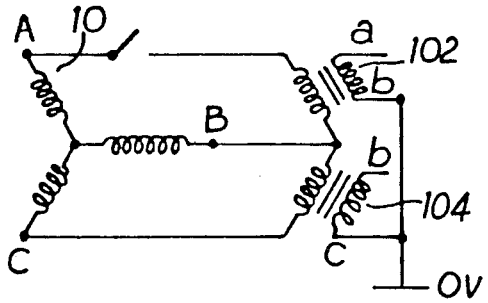
FIGS. 7 to 12 illustrate possible generator fault conditions detected by the circuit of FIG. 5.

FIG. 7 shows a first fault condition in which the winding A of the generator 10 is open circuit. Since there is no ac voltage on the primary of 102, there will be dc on the secondary, so the voltage waveform Vab (see FIG. 6a) will be zero with a source resistance equal to the winding resistance of the transformer. With reference now to FIG. 6a because Vab is zero the cathode of diode 112 will be held virtually to the earth potential continuously. Thus the voltage at the cathode of diode 120 will continuously be in a negative condition with respect to the threshold voltage VT and with reference to the dotted lines in FIGS. 6b and 6c the output of comparator 126 will remain high continuously and capacitor 134 will charge to the potential of the positive rail 124 thereby exceeding VREF 136 and consequently indicating a fault condition by means of comparator 142 turning on.

Figure 8:
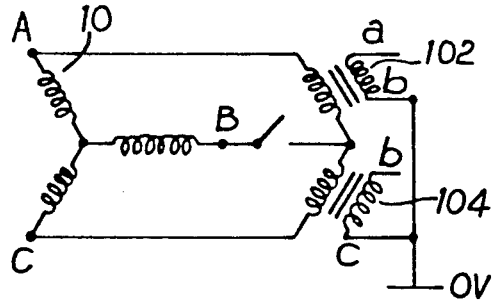

With reference now to FIG. 8 winding B of generator 10 is assumed open circuit. Thus the voltage waveforms Vab and Vbc will overlap because the primaries of sensing transformers 102 and 104 will be in series between windings A and C with winding B not affecting the signal on the common point of the transformers 102 and 104. Thus, with reference to FIG. 6a the voltages Vab and Vbc will be superimposed (time T17 being coincident with T12 and T13 coincident with T16). Thus the voltage at the cathode of diode 120 will be in a positive condition for a complete half cycle and the output of comparator 126 will be on during the interval T12 to T16 of FIG. 6a. Capacitor 134 will discharge during this period and its voltage will reduce below VREF 140.

Thus capacitor 134 will become increasingly discharged leading to a fault indication by the turning on of comparator 144.

Figure 9:
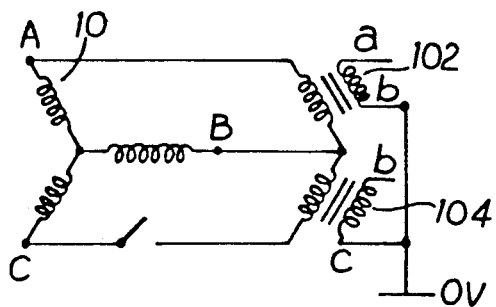

With reference now to FIG. 9 winding C is assumed open circuit, and in a similar manner to winding A being open circuit as described with reference to FIG. 7, voltage Vbc will be zero. Thus diode 120 will be held in a negative condition continuously causing comparator 126 to be OFF continuously allowing steady charging of capacitor 134 until the voltage level of this capacitor increases above VREF 136 thereby indicating a fault condition.

Figure 10:
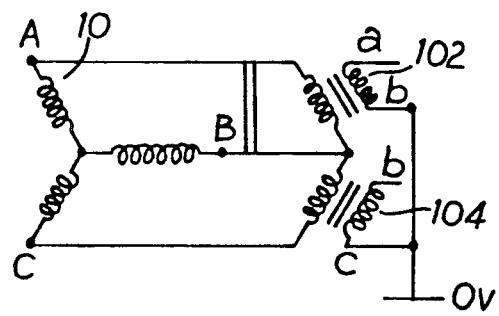

With reference to FIG. 10 a short circuit is assumed between windings A and B of generator 10. Transformer 102 will therefore not receive any signal across its primary winding and there will consequently be no output signal Vab. Thus the terminal of resistor 108 connected to transformer 102 will be connected, over the secondary winding of this transformer, to the earth rail 106. The cathode of diode 112 will therefore also be connected to the earth rail via resistor 108 and this will pull down the voltage on the anode of diode 112 and therefore the voltage on the anode of diode 120 will also be pulled down. This will in turn ensure that the voltage on the cathode of diode 120 will be constantly below the voltage threshold VT.

Comparator 126 will therefore be constantly in an OFF condition and capacitor 134 will therefore continuously charge via the resistor chain 130 and 132 until the voltage across it rises to above VREF 136 at which time comparator 142 will change to an ON condition thereby providing a fault indicator on output terminal OPT.

Figure 11:
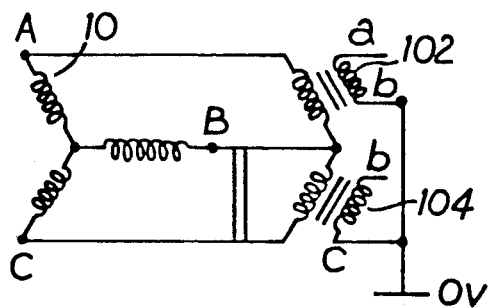

With reference now to FIG. 11, a short circuit is assumed between windings B and C or generator 10. Transformer 104 will not therefore receive any signal across its primary winding and there will consequently be no output signal Vbc. Thus the terminal of resistor 110 connected to transformer 104 will be connected, via the secondary winding of the transformer, to the earth rail 106. The cathode of diode 114 will therefore also be connected to the earth rail via resistor 110 and this will pull down the voltage on the anode of diode 114 and therefore the voltage on the anode of diode 120 will also be pulled down. This will ensure that the voltage on the cathode of diode 120 will be constantly below the voltage threshold VT.

Comparator 126 will therefore be constantly in an OFF condition and capacitor 134 will therefore continuously charge via the resistor chain 130 and 132 until the voltage across it rises to above VREF 136 at which time comparator 142 will change to an ON condition thereby providing a fault indication on output terminal OPT.

Figure 12:
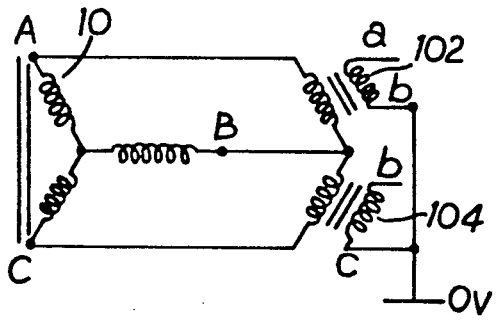

With reference to FIG. 12 a short circuit is assumed between windings A and C of generator 10. In this case transformers 102 and 104 will be connected in series opposition and therefore voltages Vab and Vbc will be 180° out of phase with no overlap. Thus there will be no period T12 to T13 in FIG. 6a when capacitor 134 is discharged. Thus the charge on capacitor 134 will steadily build up as shown by the dotted line (commencing at T12) until the voltage across capacitor 134 exceeds VREF 136 at which time comparator 142 changes to an ON condition thereby providing a fault indication on output terminal OPT.

The circuit therefore provides a fault indication for all normal fault conditions of generator 10 (i.e. an open circuit in any line or a short circuit between any two lines). The charging and discharging of capacitor 134 must, in a practical embodiment be subject to tolerances because of possible distortion of the output waveforms of generator 10. With reference to FIG. 6a the phase difference between waveforms Vab and Vbc at zero volts is theoretically 60°. Assuming a 17 volt RMS waveform value for Vab and Vbc and a +2 volt threshold VT the time interval T12 to T13 represents approximately 50° phase difference.

the +2 volt threshold is chosen in a practical circuit to ensure that the forward voltage drops in the diodes are overcome and also to eliminate possible errors due to short circuit conditions not being absolute.

In a preferred practical embodiment component values of the circuit of FIG. 5 are selected to allow a tolerance of between 10° and 97° for the time period T12 to T13. Thus high current loadings which temporarily distort the output waveforms of generator 10 will not cause a fault to be indicated because of the tolerance allowed for by virture of the slow charge and discharge rate of capacitor 134.

The system is applicable to both star-connected and delta-connected generators.

Figure 13:
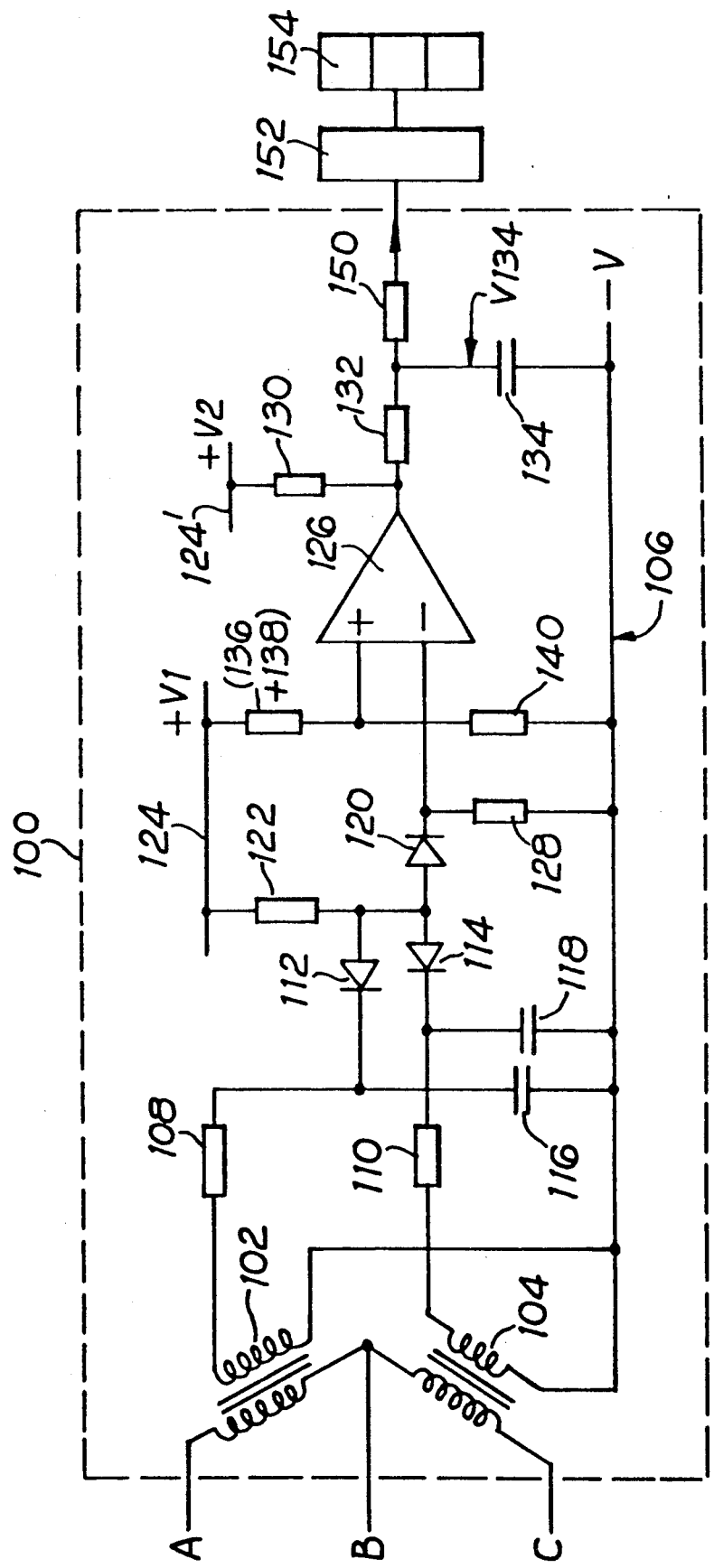
FIG. 13 shows a preferred modification of the three phase A.C. generator fault detector as shown in FIG. 5.

FIG. 13 shows a preferred alternative three phase A.C. generator fault detector to the embodiment of FIG. 5. In this figure the same reference numerals are used to indicate circuit elements which perform the same or a substantially similar function. In this alternative embodiment the comparator constituted by operational amplifiers 142, 144 and associated components is omitted. The voltage on capacitor 134 is applied via a buffer resistor 150 to an analogue to digital (A to D) converter 152 which may be of any suitable known type. The output of the A to D converter 152 is fed to a computer 154 of any suitable known type where any necessary comparisons with reference may be made in known manner by a simple program.

In known manner the A to D converter 152 will sample the voltage on capacitor 134 at predetermined intervals. The positive voltage rail 1241 connected to the resistor 130 is shown at a different potential to rail 124 connected to resistors 122 and 136+138 (combined). This enables the voltage on capacitor 134 to be adjusted to suit the input range of the A to D converter 152.

I claim:

1. A fault detector for a multi-phase alternating current (A.C.) generator, said fault detector being substantially insensitive to variations in magnitude or amplitude of generated voltage and current, including means for determining a difference in phase angle between only two line-to-line voltages of a generator and means for comparing this difference in phase angle with a predetermined phase angle value or range of phase angle values to indicate any open or short circuit fault when, for a particular multi-phase system, said phase difference varies from a set angle by greater than a predetermined angle change.

2. A fault detector for a multi-phase A.C. generator as claimed in claim 1 in which the means for determining the phase difference between the two line-to-line voltages includes timing means for determining when the voltages are above a predetermined voltage level.

3. A fault detector for a multi-phase alternating circuit (A.C.) generator, said fault detector being substantially insensitive to variations in magnitude or amplitude of generated voltage and current, comprising means for determining a difference in phase angle between only two line-to-line voltages of a generator, said means including an integrator discharged only when both the line-to-line voltages are above a predetermined voltage level and means for comparing this difference in phase angle with a predetermined phase angle value or range of phase angle values to indicate any open or short circuit fault when, for a particular multi-phase system, said phase difference varies from a set angle by greater than a predetermined angle change.

4. A fault detector for a multi-phase A.C. generator as claimed in claim 3 or claim 2 in which the output of the integrator is monitored, and a fault condition is indicated if the output level of the integrator is outside predetermined limits.

5. A fault detector for a multi-phase A.C. generator as claimed in claim 4 in which the output of the integrator is monitored by a comparator means including first and second operational amplifiers, the output of the first and second operational amplifiers indicating fault conditions.

6. A fault detector for a multi-phase A.C. generator as claimed in claim 4 in which the output of the integrator is monitored by an analogue to digital converter connected to a computer which is operative to analyze the output of the digital to analogue converter to indicate fault conditions.

7. A fault detector for a multi-phase A.C. generator as defined in claim 3 in which the means for determining the phase difference between the two line-to-line voltages further includes timing means for determining when the voltages are above a predetermined voltage level.

* * * * *

UNITED STATES PATENT AND TRADEMARK OFFICE
CERTIFICATE OF CORRECTION

PATENT NO. : 5,126,678
DATED : June 30, 1992
INVENTOR(S) : David C. WILLIAMS

It is certified that error appears in the above-identified patent and that said Letters Patent is hereby corrected as shown below:

On the title page, item (73):

-- Assignee: Lucas Industries public limited company, Birmingham, England --;

On the title page, column 2, below "Assistant Examiner - Maura K. Regan" insert the following:

-- Attorney, Agent or Firm - Finnegan, Henderson, Farabow, Garrett & Dunner --;

In the Abstract, line 3, change "voltage" to -- voltages --.

Signed and Sealed this

Seventh Day of September, 1993

Attest:

BRUCE LEHMAN

Attesting Officer     Commissioner of Patents and Trademarks